United States Patent
Kim et al.

(10) Patent No.: US 7,969,084 B2
(45) Date of Patent: Jun. 28, 2011

(54) DISPLAY DEVICE HAVING BACKLIGHT DEVICE AND ELECTRON EMISSION UNIT

(75) Inventors: Il-Hwan Kim, Suwon-si (KR); Young-Churl Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 291 days.

(21) Appl. No.: 12/260,022

(22) Filed: Oct. 28, 2008

(65) Prior Publication Data
US 2009/0141480 A1   Jun. 4, 2009

(30) Foreign Application Priority Data
Nov. 30, 2007   (KR) .................. 10-2007-0123589

(51) Int. Cl.
*H01J 63/04* (2006.01)
*H01J 1/62* (2006.01)
*G09G 3/36* (2006.01)

(52) U.S. Cl. ......... 313/495; 313/497; 313/498; 345/102

(58) Field of Classification Search .......... 313/495–498, 313/308–309, 311
See application file for complete search history.

(56) References Cited

U.S. PATENT DOCUMENTS

| 2007/0035231 A1* | 2/2007 | Song et al. .............. 313/496 |
| 2007/0247056 A1* | 10/2007 | Lee et al. ............... 313/496 |
| 2007/0268240 A1* | 11/2007 | Lee et al. ............... 345/102 |

\* cited by examiner

*Primary Examiner* — Nimeshkumar D Patel
*Assistant Examiner* — Tracie Green
(74) *Attorney, Agent, or Firm* — Christie, Parker & Hale, LLP

(57) ABSTRACT

A display device is provided including a display panel for displaying an image and a backlight panel for providing light to the display panel. The backlight panel includes a vacuum chamber including a first substrate, a second substrate, and a sealing member. Cathode electrodes are on a side of the first substrate along a first direction with a gap between each other. Gate electrodes are between the cathode electrodes. Electron emission regions are at either sides of the cathode electrodes facing the gate electrodes. A diffusion electrode is above the cathode electrodes and the gate electrodes. An insulator is between the diffusion electrode and the cathode electrodes and between the diffusion electrode and the gate electrodes. Openings are in the diffusion electrode for exposing the electron emission regions. A light emitting unit is on the second substrate.

18 Claims, 9 Drawing Sheets

DISPLAY DEVICE HAVING BACKLIGHT DEVICE AND ELECTRON EMISSION UNIT

CROSS-REFERENCE TO RELATED APPLICATION

This application claims priority to and the benefit of Korean Patent Application No. 10-2007-0123589 filed in the Korean Intellectual Property Office on Nov. 30, 2007, the entire content of which is incorporated herein by reference.

BACKGROUND OF THE INVENTION

1. Field of the Invention

The present invention relates to a display device having a backlight device. More particularly, the present invention relates to an electron emission unit that is arranged in a backlight panel and emits electrons toward a phosphor layer.

2. Description of the Related Art

A backlight panel includes a phosphor layer and an anode at an interior side of a front substrate, and electron emission regions and driving electrodes at an interior side of a rear substrate. The front and rear substrates are sealed to each other at their peripheries using a sealing member, and the inner space between the first and second substrates is exhausted to form a vacuum chamber.

The driving electrodes include cathode electrodes arranged with a gap along a direction of the rear substrate and gate electrodes arranged between the cathode electrodes in parallel therewith. In addition, an electron emission region is formed at a side of the cathode electrode facing the gate electrode.

When a driving voltage is applied to the cathode electrodes and the gate electrodes, an electric field is formed near the electron emission regions by a voltage difference between the cathode electrodes and the gate electrodes, and accordingly, electrons are emitted from the electron emission regions. The emitted electrons are accelerated by a high voltage (anode voltage) applied to the anode and collide on the phosphor layer so as to excite the phosphor layer whereby visible light is emitted.

Uniform luminance and efficiency are important characteristics of the backlight panel. It is preferred that uniform luminance is realized throughout an entire active area of the backlight panel. Efficiency (in luminance and/or power consumption) of the backlight panel is enhanced by realizing high luminance with low power consumption.

According to a conventional backlight panel, electrons are emitted in one direction from the cathode electrode to the gate electrode. Therefore, electrons are not uniform on the phosphor layer, and the luminance uniformity is not high. In addition, since the entire electron emission regions are exposed to the anode electric field, a diode emission in which electrons are emitted due to the anode electric field may occur. Therefore, the anode voltage can be increased within a very limited level, and thus the luminance of the backlight panel can be increased within a very limited level.

The above information disclosed in this Background section is only for enhancement of understanding of the background of the invention and therefore it may contain information that does not form the prior art that is already known in this country to a person of ordinary skill in the art.

SUMMARY OF THE INVENTION

Aspects of embodiments of the present invention are directed toward a backlight panel and a display device using the same for increasing luminance uniformity by improving electron beam dispersion characteristic, suppressing diode emission by shielding an effect of anode electric field with respect to electron emission regions, and realizing high luminance by increasing an anode voltage.

In an exemplary embodiment of the present invention, a display device is provided including a display panel for displaying an image; and a backlight panel for providing light to the display panel. The backlight panel has a vacuum chamber including a first substrate, a second substrate, and a sealing member. Cathode electrodes are on a side of the first substrate along a first direction with a gap between each other. Gate electrodes are between the cathode electrodes. Electron emission regions at either sides of the cathode electrodes facing the gate electrodes. A diffusion electrode is above the cathode electrodes and the gate electrodes. An insulator is between the diffusion electrode and the cathode electrodes and between the diffusion electrode and the gate electrodes. Openings are in the diffusion electrode for exposing the electron emission regions. A light emitting unit is at the second substrate.

In one exemplary embodiment, one opening of the openings in the diffusion electrode exposes one gate electrode of the gate electrodes and a pair of the electron emission regions facing each other with the one gate electrode between the pair of the electron emission regions.

In one exemplary embodiment, a center of the one gate electrode coincides with a center of the one opening.

In one exemplary embodiment, the diffusion electrode receives a voltage higher than a voltage applied to the gate electrodes and lower than a voltage applied to the light emitting unit.

In one exemplary embodiment, the insulator is one selected from the group consisting of an insulation layer and an insulation substrate.

In one exemplary embodiment, the cathode electrodes are electrically connected together and receive a same cathode voltage, and the gate electrodes are electrically connected together and receive a same gate voltage.

In one exemplary embodiment, at least two cathode electrodes of the cathode electrodes and at least one gate electrode of the gate electrodes form one electron emission element such that a plurality of electron emission elements are formed thereby having a gap with each other.

In one exemplary embodiment, the one electron emission element includes at least two gate electrodes of the gate electrodes. A first connector connects the cathode electrodes and a second connector connects the gate electrodes at each of the electron emission elements. The first connector and the second connector are respectively connected with a first wire and a second wire.

In one exemplary embodiment, the first wire and the second wire are coupled to each of the electron emission elements.

In one exemplary embodiment, the first wire is electrically connected with the first connector of the electron emission elements that are arranged extending along a first direction of the first substrate. The second wire is electrically connected with the second connector of the electron emission elements that are arranged extending along a second direction perpendicular to the first direction.

In one exemplary embodiment, the display panel includes first pixels and the backlight panel includes second pixels that correspond to a number of the electron emission elements, and the second pixels are smaller in number than the first pixels.

In one exemplary embodiment, a respective one of the second pixels independently emits light corresponding to a highest gray level of the first pixels corresponding to the respective one of the second pixels.

In one exemplary embodiment, the display panel is a liquid crystal display panel.

In an exemplary embodiment of the present invention, a display device is provided including a display panel for displaying an image; and a backlight panel for providing light to the display panel. The backlight panel includes a vacuum chamber including a first substrate, a second substrate, and a sealing member. First electrodes are on a side of the first substrate along a first direction with a gap between each other. Second electrodes are between the first electrodes. Electron emission regions are at either sides of the first electrodes facing the second electrodes. A third electrode is above the first electrodes and the second electrodes. An insulator is between the third electrode and the first electrodes and between the third electrode and the second electrodes. Openings are in the third electrode for exposing the electron emission regions. A light emitting unit is at the second substrate. The light emitting unit includes a fourth electrode.

In one exemplary embodiment, the first electrodes are cathode electrodes, the second electrodes are gate electrodes, the third electrode is a diffusion electrode, and the fourth electrode is an anode electrode.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
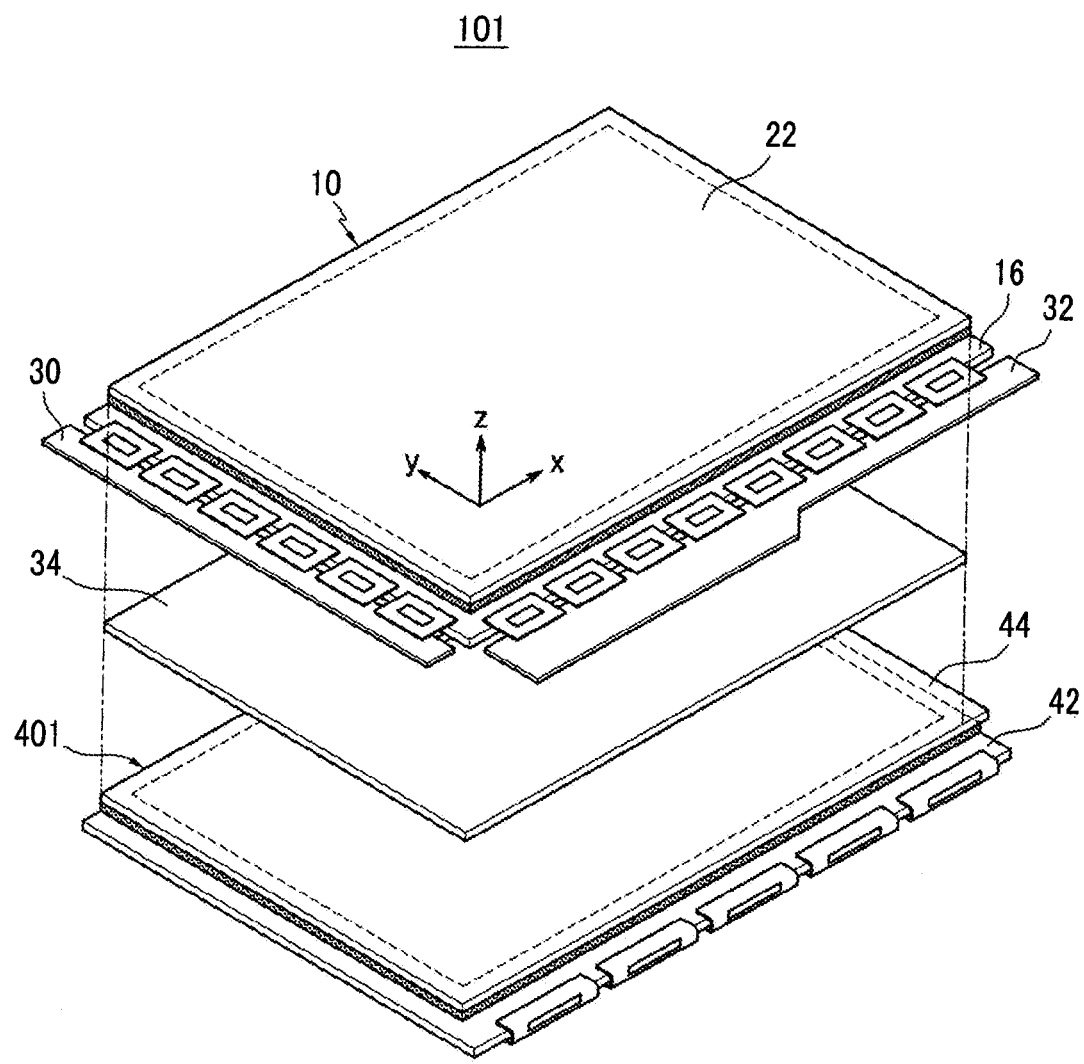
FIG. 1 is an exploded perspective view of a display device according to a first exemplary embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

FIG. 1 is an exploded perspective view of a display device 101 according to a first exemplary embodiment of the present invention. The display device 101 includes a display panel 10 that displays an image, and a backlight panel 401 that is arranged at a rear of the display panel 10 and provides light to the display panel 10. A diffusion plate 34 for evenly diffusing light emitted from the backlight panel 401 may be provided between the backlight panel 401 and the display panel 10. The backlight panel 401 and the diffusion plate 34 are positioned with a distance (e.g., a predetermined distance) from each other.

The display panel 10 is a liquid crystal display panel or another non-self luminous display panel. Hereinafter, the present exemplary embodiment is described assuming that the display panel 10 is a liquid crystal display panel.

Figure 2:
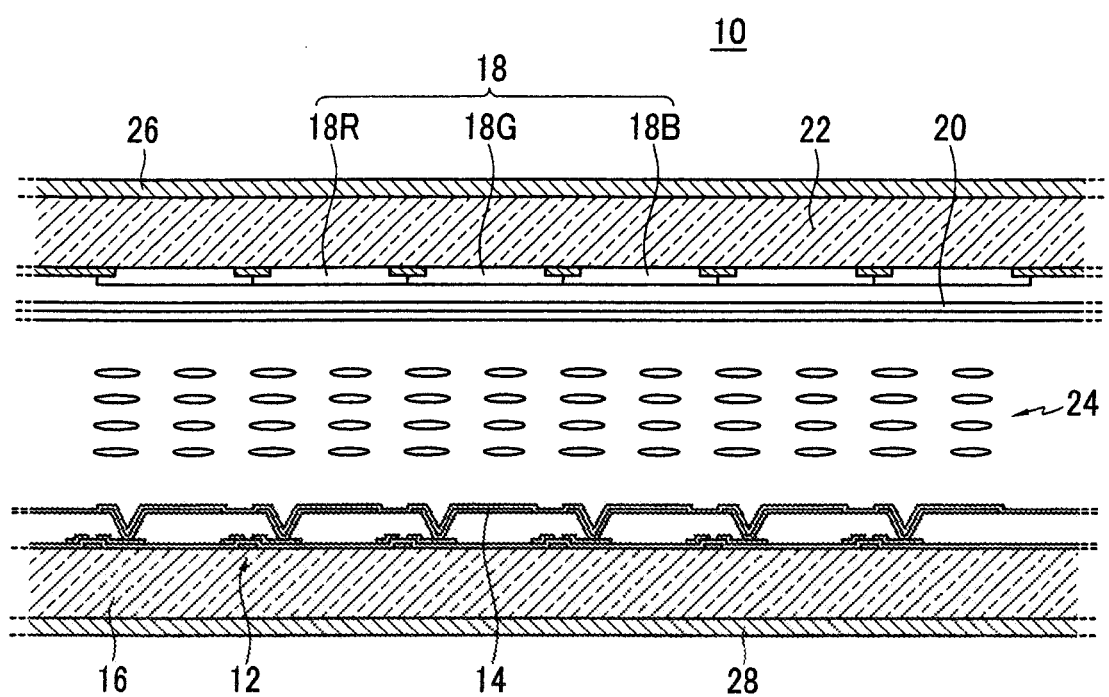
FIG. 2 is a partial cross-sectional view of a display panel shown in FIG. 1.

FIG. 2 is a partial cross-sectional view of the display panel 10 shown in FIG. 1. The display panel 10 includes a rear substrate 16, a front substrate 22, and a liquid crystal layer 24 formed therebetween. A plurality of thin film transistors (TFTs) 12 and a plurality of pixel electrodes 14 are formed on the rear substrate 16. A color filter layer 18 and a common electrode 20 are formed on the front substrate 22. An upper polarizing plate 26 and a lower polarizing plate 28 are respectively attached on an upper side of the front substrate 22 and on a lower side of the rear substrate 16 so as to polarize light passing through the display panel 10.

The pixel electrode 14 is arranged for each subpixel, and its operation is controlled by the TFT 12. The color filter layer 18 includes a red filter layer 18R, a green filter layer 18G, and a blue filter layer 18B that are arranged for each subpixel. The pixel electrodes 14 and the common electrode 20 are formed of a transparent conducting material.

For a specific subpixel, when the TFT 12 is turned on, an electric field is formed between the pixel electrode 14 and the common electrode 20. This electric field varies an alignment angle of the liquid crystal molecules in the liquid crystal layer 24, and the variation of the alignment angle causes a variation of the light transmission. By such a mechanism, the display panel 10 can control the luminance and color for each pixel.

Referring back to FIG. 1, a gate printed circuit board assembly (PBA) 30 transmits a gate driving signal to a gate electrode of each TFT, and a data PBA 32 transmits a data driving signal to a source electrode of each TFT.

Figure 3:
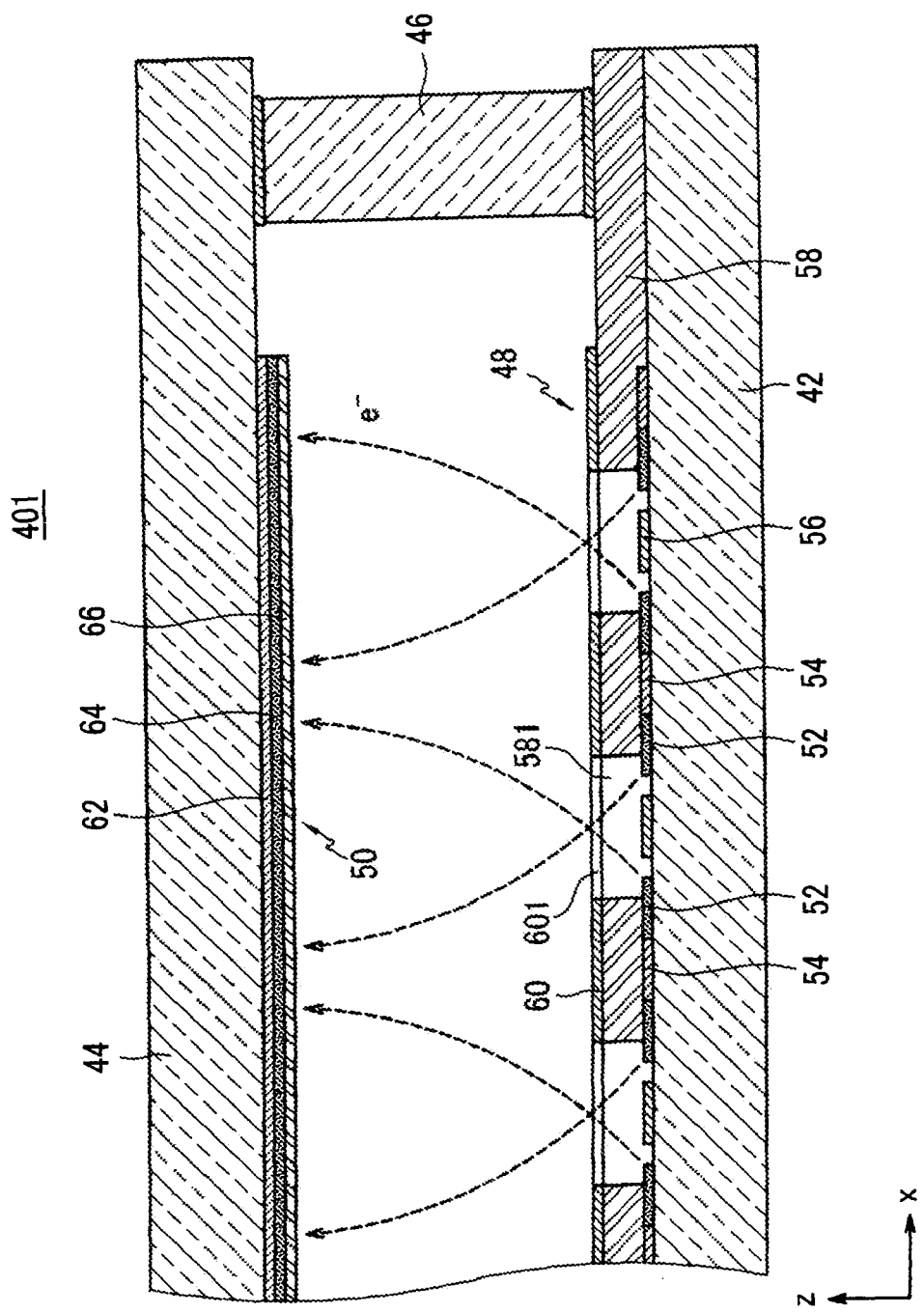
FIG. 3 is a partial cross-sectional view of a backlight panel of a display device shown in FIG. 1.

FIG. 3 is a partial cross-sectional view of a backlight panel 401 of a display device shown in FIG. 1. The backlight panel 401 includes a first substrate 42 and a second substrate 44 that are arranged in parallel and facing each other with a gap (e.g., a predetermined gap) therebetween. The first substrate 42 and the second substrate 44 are sealed together along their edges with a sealing member 46. The interior space encapsulated by the first and second substrates 42 and 44 and the sealing member 46 is exhausted at about $10^{-6}$ Torr of vacuum degree. Therefore, the first and second substrates 42 and 44 and the sealing member form a vacuum envelope.

The first substrate 42 and the second substrate 44 may include an active area where visible light is actually emitted and an inactive area that encloses the active area. An electron emission unit 48 for emitting electrons is placed at the active area that is formed on an interior side of the first substrate 42 (or at a side of the first substrate 42 facing the second substrate 44), and a light emitting unit 50 for emitting visible light is at the inactive area that is formed on an interior side of the second substrate 44 (or a side of the second substrate 44 facing the first substrate 42). The second substrate 44 where the light emitting unit 50 is placed may be the front substrate of the backlight panel 401.

The electron emission unit 48 includes electron emission regions 52, cathode electrodes 54 and gate electrodes 56 that control emission current of the electron emission regions 52, and a diffusion electrode 60 that is placed above the cathode electrodes 54 and the gate electrodes 56 in order to enhance the dispersion characteristics. An insulator 58 is between the diffusion electrode 60 and the cathode and gate electrodes 54, 56.

Figure 4:
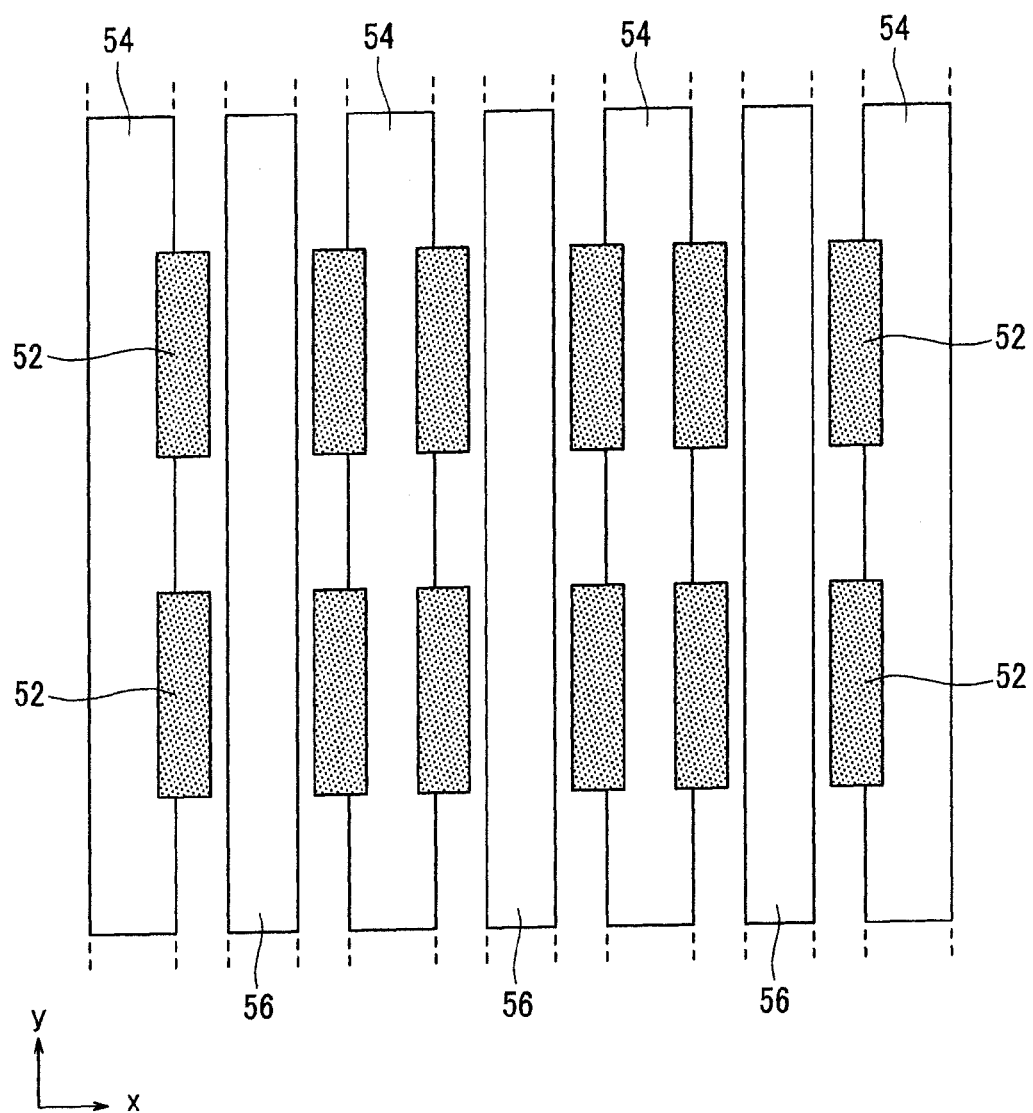
FIG. 4 is a partial top plan view of cathode electrodes, gate electrodes, and electron emission regions of an electron emission unit shown in FIG. 3.
Figure 5:
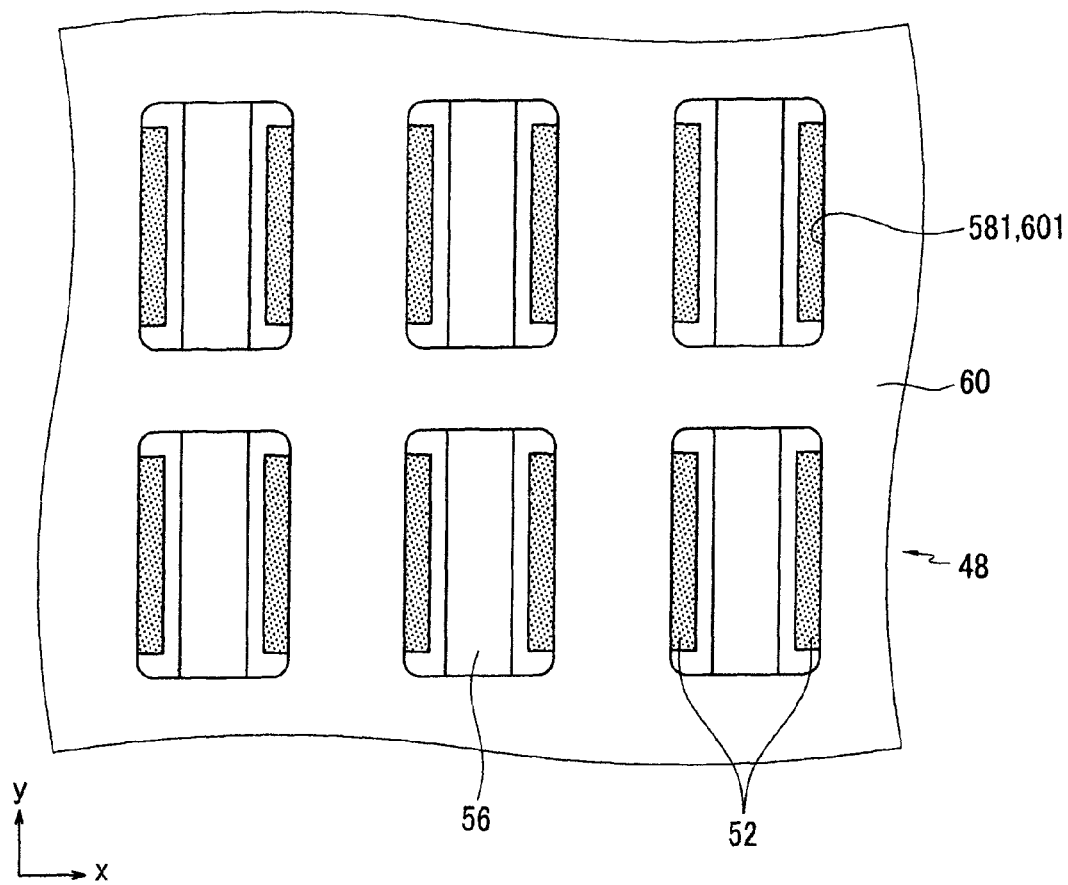
FIG. 5 is a partial top plan view of an electron emission unit shown in FIG. 3.

FIG. 4 is a partial top plan view of cathode electrodes 54, gate electrodes 56, and electron emission regions 52 of an electron emission unit shown in FIG. 3, and FIG. 5 is a partial top plan view of an electron emission unit shown in FIG. 3.

Referring to FIG. 3, FIG. 4, and FIG. 5, the cathode electrodes 54 are formed on the first substrate 42 along a first direction (y axis direction in the drawing) in a stripe pattern, with a gap in a direction (x axis direction in the drawing) perpendicular to the first direction. The gate electrodes 56 are formed between and in parallel to the cathode electrodes 54, and they are formed apart from the cathode electrodes 54 by a distance (e.g., a predetermined distance).

The electron emission regions 52 are formed at both sides of the cathode electrodes 54 facing the gate electrodes 56, and they are electrically connected with the cathode electrodes 54. The electron emission regions 52 are apart from the gate electrodes 56 so that they are not shorted with the gate electrodes 56.

The electron emission regions 52 may contact a lateral side of the cathode electrodes 54, or they may be formed entirely on the lateral side of the cathode electrodes 54 and partially on an upper side of cathode electrodes 54, so that a contact area for contacting the cathode electrodes 54 may be enlarged. FIG. 3 shows an exemplary embodiment in which the electron emission regions 52 contact the lateral side of the cathode electrodes 54. However, the present invention is not thus limited.

The electron emission regions 52 are formed of a material that can emit electrons when an electric field is applied under a vacuum atmosphere. For example, the electron emission regions 52 may be formed of a carbon-based material and/or a nanometer-sized material. In addition, the electron emission regions 52 may be formed of a material selected from the group consisting of carbon nanotubes, graphite, graphite nanofibers, diamond-like carbon, fullerene ($C_{60}$), silicon nanowires, and combinations thereof.

The insulator 58 and the diffusion electrodes 60 are formed on the cathode electrodes 54 and the gate electrodes 56. The insulator 58 and the diffusion electrodes 60 are entirely formed over the active area of the first substrate 42, and they form their own openings 581 and 601 that expose the gate electrodes 56 and the electron emission regions 52.

Respective openings 581 and 601 expose one specific gate electrode 56 and a pair of electron emission regions 52 that are arranged facing each other interposing the specific gate electrode 56. The openings 581 and 601 are positioned such that a center of the gate electrode 56 coincide with centers of the openings 581 and 601, and the electron emission regions 52 located at the left and the right of the gate electrode 56 are exposed with the same area.

The insulator 58 may be formed as an insulation layer or an insulation substrate. The insulation layer may be formed by processes of coating an insulating material to cover the cathode electrodes 54, the gate electrodes 56, and the electron emission regions 52, and then drying and baking the coat. The opening 581 may be formed by removing a part of the insulation layer by an etching process. FIG. 3 shows that the insulator 58 is formed as an insulation layer.

Figure 6:
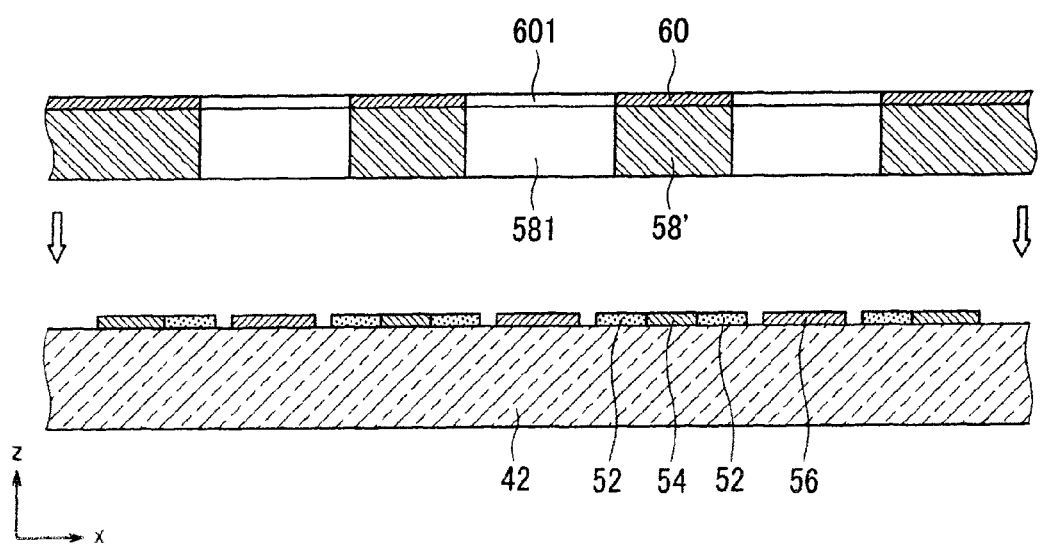
FIG. 6 is a partial cross-sectional view showing an assembly process of a first substrate and an insulator of a backlight panel shown in FIG. 1.

Alternatively, as shown in FIG. 6, an insulator 58' may be formed as an insulation substrate such as glass, ceramic, and tempered glass. The opening 581 may be formed at the insulation substrate by a machining process or an etching process, and the insulation substrate may be assembled with and fixed to the first substrate 42.

Referring back to FIG. 3, the light emitting unit 50 includes an anode 62, a phosphor layer 64 located at a side of the anode 62, and a reflective layer 66 that covers the phosphor layer 64.

The anode 62 is formed of a transparent conductive material such as indium tin oxide (ITO) so as to transmit visible light emitted from the phosphor layer 64. The anode 62, which accelerates electron beams, receives a positive direct current (DC) voltage (anode voltage) of several thousand volts to maintain the phosphor layer 64 to be in a high potential state.

The phosphor layer 64 may be made of a mixed phosphor of red, green, and blue phosphors to emit white light.

The reflective layer 66 may be formed of a thin aluminum film with a thickness of about several thousand Å, and includes small holes for passing or transmitting the electron beams.

The reflective layer 66 reflects visible light, which is emitted toward the first substrate 42 from the phosphor layer 64, to the second substrate 44 to increase luminance of the backlight panel 401. In addition, the anode 62 may not be provided and instead, the reflective layer 66 may receive the anode voltage to function as the anode electrode.

Spacers are disposed between the first substrate 42 and the second substrate 44, and the spacers support against compression of the vacuum chamber and maintain a gap between the substrates 42 and 44.

According to the above backlight panel 401, the cathode electrodes 54 are electrically connected with each other so as to receive the same cathode voltage, and the gate electrodes 56 are also electrically connected with each other so as to receive the same gate voltage. The cathode voltage may be set as 0V or in a range of several to several ten volts, and the gate voltage may be set in a range of several to several ten volts that is higher than the cathode voltage by a threshold value. The diffusion electrode 60 receives a voltage that is higher than the gate voltage and is lower than the anode voltage, and the anode 62 receives the anode voltage of higher than 5 kV. That is, the diffusion electrode receives a voltage higher than a voltage applied to the gate electrodes and lower than a voltage applied to the light emitting unit.

Thereby, electric fields are formed around the electron emission regions 52 in pixels where a voltage difference between the cathode electrode 54 and the gate electrode 56 is greater than a threshold value, and electrons are emitted therefrom. The emitted electrons are diffused while passing through the opening 601 of the diffusion electrode 60. The electrons that pass through the diffusion electrode 60 are pulled by the anode voltage applied to the anode electrode 62 to collide with the corresponding phosphor layer 64, thereby causing light emission.

In the above operation, as for the electron emission region 52 at the left of the gate electrode 56, electrons are emitted in a rightward direction toward the gate electrode 56. As for electron emission region 52 at the right of the gate electrode 56, the electrons are emitted in a leftward direction toward the gate electrode 56. While the electrons are emitted in the two directions, the diffusion electrode 60 diffuses the electrons passing through the opening 601. Therefore, the electrons uniformly spread on the phosphor layer 64, and the luminance uniformity is increased.

Since the luminance uniformity of the backlight panel 401 is improved, the diffusion plate (refer to 34 in FIG. 1) may not be employed, or a distance between the diffusion plate 34 and the backlight panel 401 may be reduced. Therefore, according to the display device 101 having the backlight panel 401 of the present exemplary embodiment, light loss due to the diffusion plate 34 may be reduced or minimized.

In addition, in the above operation, the diffusion electrode 60 above the electron emission regions 52 shields the effect of the anode electric field on the electron emission regions 52. Therefore, the backlight panel 401 may suppress arcing in the vacuum chamber and the diode emission due to the anode electric field, and the luminance of the backlight panel 401 may be increased by applying a voltage of higher than 10 kV (for example, in a range of 10-15 kV) to the anode 62. The luminance of the backlight panel 401 is proportional to the anode voltage.

Figure 7:
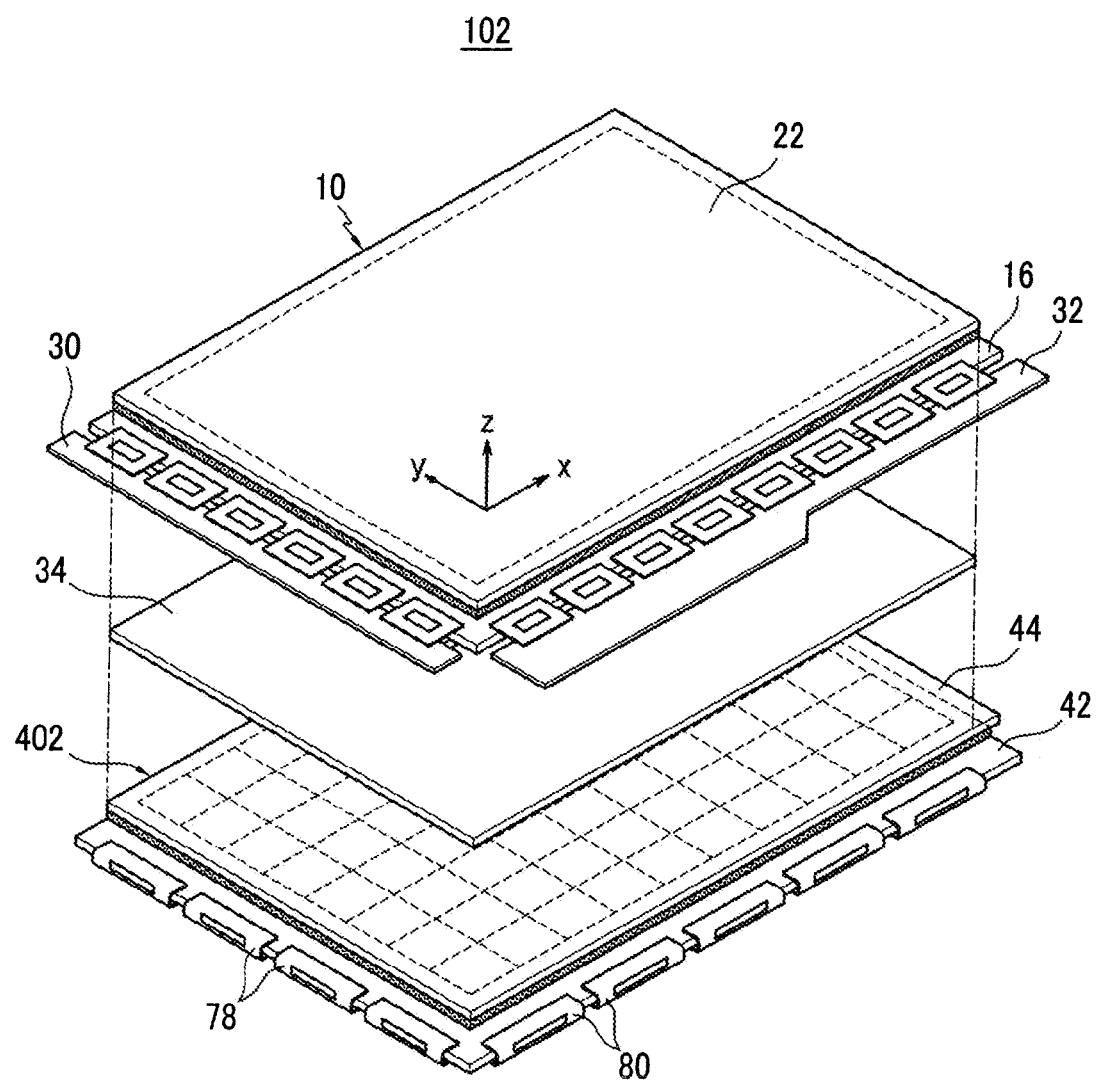
FIG. 7 is an exploded perspective view of a display device according to a second exemplary embodiment of the present invention.

FIG. 7 is an exploded perspective view of a display device 102 according to a second exemplary embodiment of the present invention. The display device 102 is the same as the display device 101 except that a backlight panel 402 includes a plurality of pixels that may independently control the luminance of the pixels. In the following description, the same reference numeral is used for the same element as the first exemplary embodiment.

Figure 8:
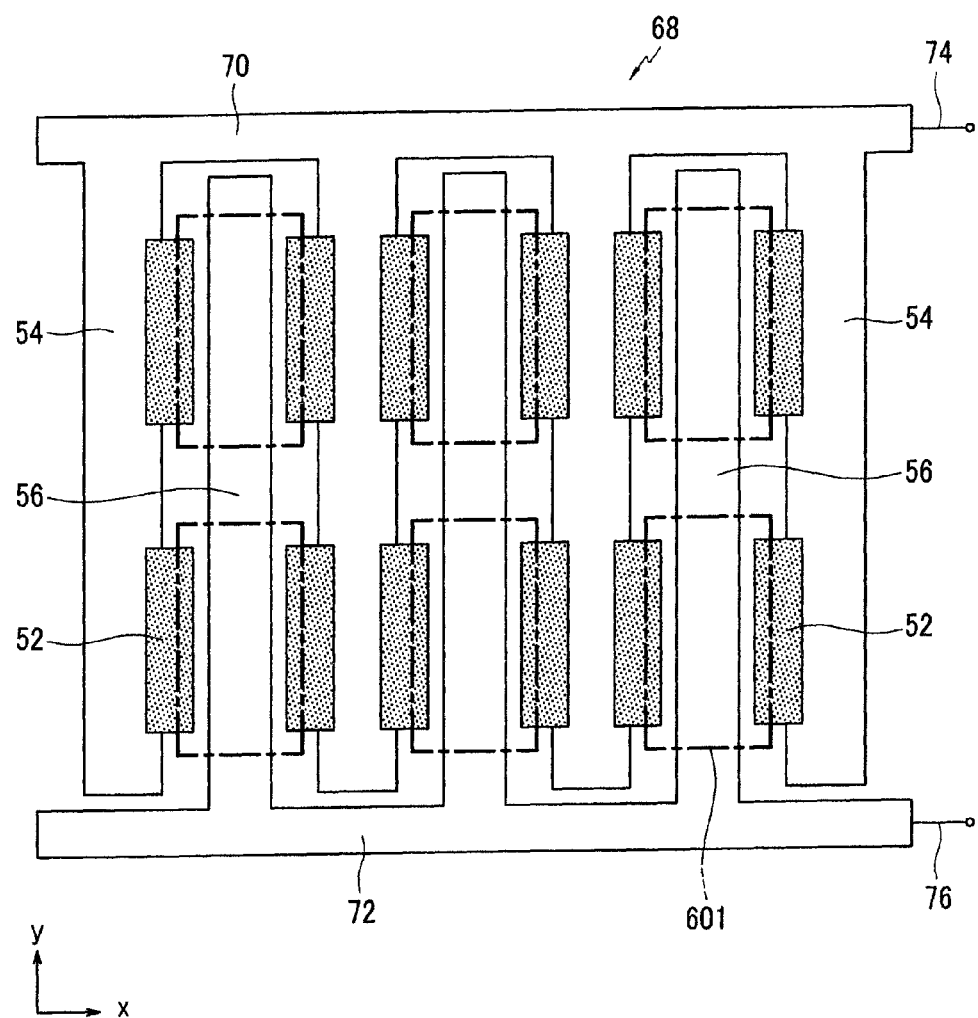
FIG. 8 is a top plan view showing one electron emission element of a backlight panel shown in FIG. 7.

According to the second exemplary embodiment, the backlight panel 402 includes a plurality of electron emission elements that are respectively arranged for respective pixels. FIG. 8 is a top plan view showing one electron emission element of a backlight panel shown in FIG. 7.

Referring to FIG. 8, an electron emission element 68 includes at least two cathode electrodes 54, at least one gate electrode 56, and an electron emission region 52 arranged in at least one side of the cathode electrodes 54 facing the gate electrode 56. FIG. 8 shows that the electron emission element 68 includes four cathode electrodes 54 and three gate electrodes 56. However, the numbers of the cathode electrodes 54, the gate electrodes 56, and the electron emission regions 52 is not limited thereto.

The cathode electrodes 54 are electrically connected with each other by a first connector 70, and the gate electrodes 56 are electrically connected with each other by a second connector 72. The first connector 70 receives a driving voltage through a first wire 74, and the second connector 72 receives the driving voltage through a second wire 76. The insulator and the diffusion electrode described in connection with the first exemplary embodiment are located above the electron emission element 68. In FIG. 8, the openings 601 of the diffusion electrode are shown in dash-dot lines.

Figure 9:
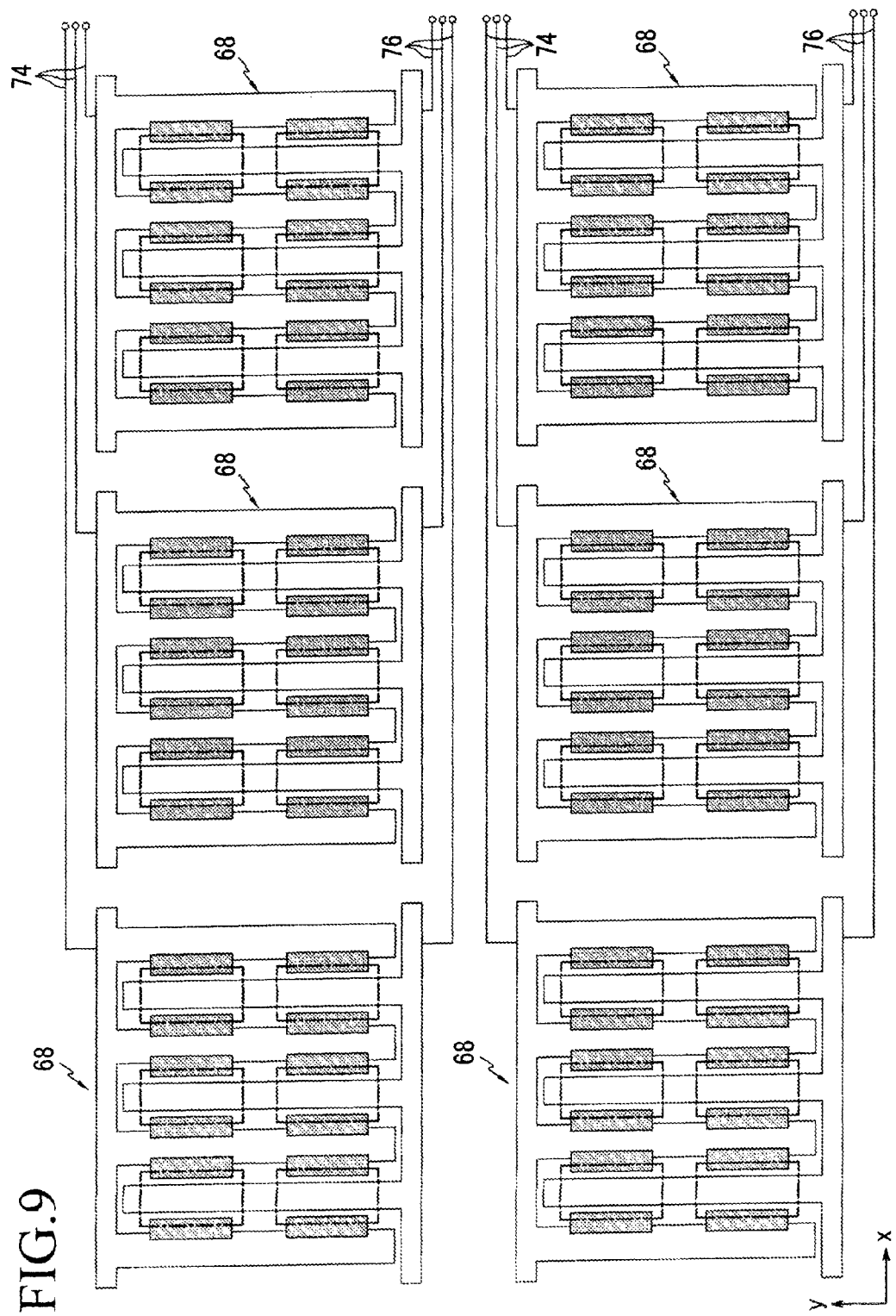
FIG. 9 and FIG. 10 are partial top plan views that show a plurality of electron emission elements of a backlight panel shown in FIG. 7.
Figure 10:
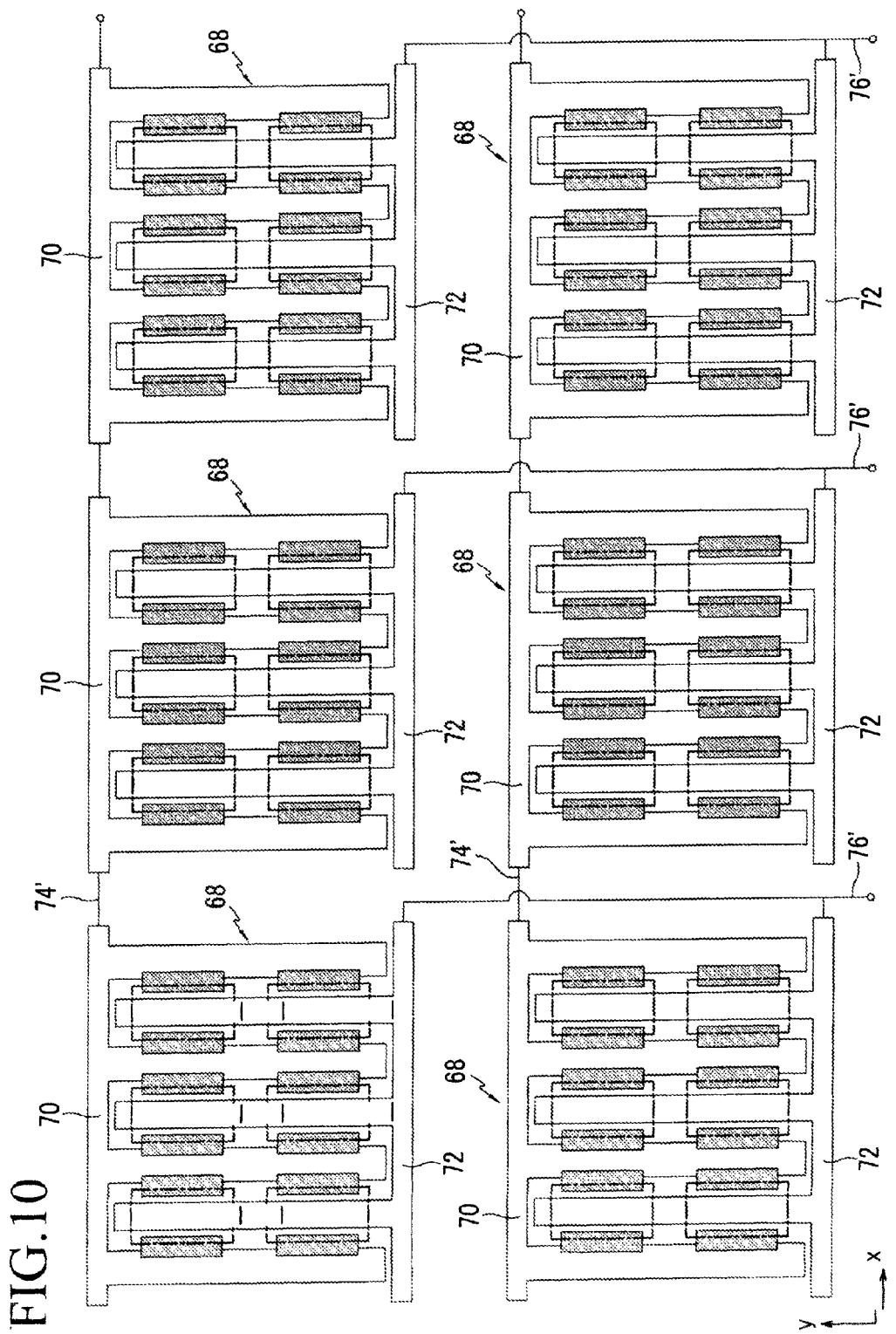

FIG. 9 and FIG. 10 are partial top plan views that show a plurality of electron emission elements of a backlight panel shown in FIG. 7.

Referring to FIG. 9, a plurality of electron emission elements 68 are arranged in the active area of the first substrate with a gap, and the first wire 74 and the second wire 76 are provided for each electron emission element 68. The first wire 74 and the second wire 76 extend to an exterior of the sealing member through the edge of the first substrate.

Alternatively, referring to FIG. 10, a first wire 74' may be electrically connected with the first connector 70 of the electron emission elements 68 arranged along a first direction (x axis direction in the drawing) of the first substrate, and the second wire 76' may be electrically connected with the second connector 72 of the electron emission elements 68 arranged along a second direction (y axis direction in the drawing) perpendicular to the first direction. The first wire 74' and the second wire 76' are insulated from each other, and extend to an exterior of the sealing member through the edge of the first substrate.

According to the arrangement shown in FIG. 10, the emission current may be controlled pixel-wise by applying the scan driving voltage to one of the first and second wires 74' and 76' and the data driving voltage to another of the first and second wires 74' and 76'.

Referring back to FIG. 7, the backlight panel 402 has less number of pixels than the display panel 10 such that one pixel of the backlight panel 402 corresponds to at least two pixels of the display panel 10. Each pixel of the backlight panel 402 may emit light in correspondence with a highest gray level of the pixels of the display panel 10 corresponding to the backlight panel pixel, and it can represent a gray level of 2 to 8 bits.

For better understanding and ease of description, the pixel of the display panel 10 is called a first pixel, and the pixel of the backlight panel 402 is called a second pixel. In addition, first pixels corresponding to one second pixel is called a first pixel group.

The driving operation of the backlight panel 402 may be as follows. ①A signal controller controlling the display panel 10 detects a highest gray level of the first pixels in the first pixel group. ②Gray level required for light emission of the second pixel depending on the detected gray level is calculated, and then converted to digital data. ③The driving signal of the backlight panel 402 is generated by using the digital data. ④The generated driving signal is applied to the driving electrodes of the backlight panel 402.

The driving signal of the backlight panel 402 may include a scan driving signal and a data driving signal. The scan PBA and the data PBA for driving the backlight panel 402 may be arranged at a rear of the backlight panel 402. In FIG. 7, a first connecting member 78 transmits the scan driving signal from the scan PBA, and a second connecting member 80 transmits the data driving signal from the data PBA.

When an image is displayed at the first pixel group, the second pixel of the backlight panel 402 emits light by a gray level (e.g., a predetermined gray level) synchronously with the first pixel group. That is, the backlight panel 402 provides light of high luminance to a bright area in the image displayed by the display panel 10, and provides light of low luminance to a dark area therein. Therefore, according to the display device of the present exemplary embodiment, a contrast ratio may be increased and an image quality may be sharpened.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A display device comprising:
    a display panel for displaying an image; and
    a backlight panel for providing light to the display panel,
    wherein the backlight panel comprises:
        a vacuum chamber including a first substrate, a second substrate, and a sealing member;
        cathode electrodes on a side of the first substrate along a first direction with a gap between each other;
        gate electrodes between the cathode electrodes;
        electron emission regions configured to emit electrons and being at either sides of the cathode electrodes facing the gate electrodes;
        a diffusion electrode configured to diffuse the electrons and being above the cathode electrodes and the gate electrodes;
        an insulator between the diffusion electrode and the cathode electrodes and between the diffusion electrode and the gate electrodes;

openings in the diffusion electrode for exposing the electron emission regions; and
a light emitting unit at the second substrate.

2. The display device of claim 1, wherein one opening of the openings in the diffusion electrode exposes one gate electrode of the gate electrodes and a pair of the electron emission regions facing each other with the one gate electrode between the pair of the electron emission regions.

3. The display device of claim 2, wherein a center of the one gate electrode coincides with a center of the one opening.

4. The display device of claim 1, wherein the diffusion electrode receives a voltage higher than a voltage applied to the gate electrodes and lower than a voltage applied to the light emitting unit.

5. The display device of claim 1, wherein the insulator is one selected from the group consisting of an insulation layer and an insulation substrate.

6. The display device of claim 1, wherein:
the cathode electrodes are electrically connected together and receive a same cathode voltage, and
the gate electrodes are electrically connected together and receive a same gate voltage.

7. The display device of claim 1, wherein at least two cathode electrodes of the cathode electrodes and at least one gate electrode of the gate electrodes form one electron emission element such that a plurality of electron emission elements are formed thereby having a gap with each other.

8. The display device of claim 7, wherein:
the one electron emission element includes at least two gate electrodes of the gate electrodes;
a first connector connects the cathode electrodes and a second connector connects the gate electrodes at each of the electron emission elements; and
the first connector and the second connector are respectively connected with a first wire and a second wire.

9. The display device of claim 8, wherein the first wire and the second wire are coupled to each of the electron emission elements.

10. The display device of claim 8, wherein:
the first wire is electrically connected with the first connector of the electron emission elements that are arranged extending along a first direction of the first substrate; and
the second wire is electrically connected with the second connector of the electron emission elements that are arranged extending along a second direction perpendicular to the first direction.

11. The display device of claim 7, wherein the display panel includes first pixels and the backlight panel includes second pixels that correspond to a number of the electron emission elements, and the second pixels are smaller in number than the first pixels.

12. The display device of claim 11, wherein a respective one of the second pixels independently emits light corresponding to a highest gray level of the first pixels corresponding to the respective one of the second pixels.

13. The display device of claim 1, wherein the display panel is a liquid crystal display panel.

14. A display device comprising:
a display panel for displaying an image; and
a backlight panel for providing light to the display panel, wherein the backlight panel comprises:
a vacuum chamber including a first substrate, a second substrate, and a sealing member;
first electrodes on a side of the first substrate along a first direction with a gap between each other;
second electrodes between the first electrodes;
electron emission regions configured to emit electrons and being at either sides of the first electrodes facing the second electrodes;
a third electrode configured to diffuse the electrons and being above the first electrodes and the second electrodes;
an insulator between the third electrode and the first electrodes and between the third electrode and the second electrodes;
openings in the third electrode for exposing the electron emission regions; and
a light emitting unit at the second substrate, the light emitting unit including a fourth electrode.

15. The display device of claim 14, wherein one opening of the openings in the third electrode exposes one second electrode of the second electrodes and a pair of the electron emission regions facing each other with the one second electrode between the pair of the electron emission regions.

16. The display device of claim 15, wherein a center of the one second electrode coincides with a center of the one opening.

17. The display device of claim 14, wherein the third electrode receives a voltage higher than a voltage applied to the second electrodes and lower than a voltage applied to the fourth electrode.

18. The display device of claim 14, wherein the first electrodes are cathode electrodes, the second electrodes are gate electrodes, the third electrode is a diffusion electrode, and the fourth electrode is an anode electrode.

* * * * *